(12) United States Patent
Stadler

(10) Patent No.: US 8,200,098 B2
(45) Date of Patent: Jun. 12, 2012

(54) METHOD AND ARRANGEMENT FOR CONTROLLING A REGENERATOR FOR DATA BURST SIGNALS OF A SYSTEM COMPRISING POINT-TO-MULTIPOINT CONNECTIONS, TRANSMISSION SYSTEM COMPRISING POINT-TO-MULTIPOINT CONNECTIONS, AND REGENERATOR

(75) Inventor: Andreas Stadler, Vienna (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 470 days.

(21) Appl. No.: 12/516,378

(22) PCT Filed: Nov. 8, 2007

(86) PCT No.: PCT/EP2007/062077
§ 371 (c)(1),
(2), (4) Date: Jun. 5, 2009

(87) PCT Pub. No.: WO2008/064984
PCT Pub. Date: Jun. 5, 2008

(65) Prior Publication Data
US 2010/0046941 A1    Feb. 25, 2010

(30) Foreign Application Priority Data
Nov. 27, 2006  (DE) .......................... 10 2006 055 928

(51) Int. Cl.
*H04B 10/16*  (2006.01)

(52) U.S. Cl. .......................... 398/166; 398/167; 398/177

(58) Field of Classification Search ................. 398/7, 37, 398/167, 166, 177
See application file for complete search history.

(56) References Cited

U.S. PATENT DOCUMENTS

| 4,710,976 A | 12/1987 | Wakabayashi et al. |
| 5,130,837 A | 7/1992 | Kitamura et al. |
| 6,069,720 A | 5/2000 | Cotter et al. |
| 7,079,536 B1 | 7/2006 | Martin et al. |
| 7,099,595 B2 * | 8/2006 | Touma .......................... 398/177 |

(Continued)

FOREIGN PATENT DOCUMENTS

DE    102005010610 A1    9/2006

(Continued)

OTHER PUBLICATIONS

ITU-T Standard G.984.3: Gigabit-capable Passive Optical Networks (G-PON): Transmission convergence layer specification, (Feb. 2004).

*Primary Examiner* — Leslie Pascal
(74) *Attorney, Agent, or Firm* — Laurence A. Greenberg; Werner H. Stemer; Ralph E. Locher

(57) ABSTRACT

A system which comprises point-to-multipoint connections and in which a portion of a downstream signal is extracted at a point located between a central network unit and a plurality of user network units, a header of the downstream signal is read and analyzed, and the header data obtained in this manner is used for controlling a regenerator provided in the upstream path for the data burst signals. The header data contains the beginning and end of the burst of the data burst signals, thus making it possible to reliably generate a temporal triggering signal for the regenerator.

22 Claims, 2 Drawing Sheets

U.S. PATENT DOCUMENTS

2004/0052528 A1  3/2004  Halgren et al.
2004/0247246 A1  12/2004  Lee et al.
2008/0193130 A1* 8/2008  Chae et al. .................... 398/67
2009/0052893 A1  2/2009  Beer et al.

FOREIGN PATENT DOCUMENTS

| EP | 0410445 A2 | 1/1991 |
| EP | 1037417 A1 | 9/2000 |
| WO | 9532568 A1 | 11/1995 |

* cited by examiner

METHOD AND ARRANGEMENT FOR CONTROLLING A REGENERATOR FOR DATA BURST SIGNALS OF A SYSTEM COMPRISING POINT-TO-MULTIPOINT CONNECTIONS, TRANSMISSION SYSTEM COMPRISING POINT-TO-MULTIPOINT CONNECTIONS, AND REGENERATOR

BACKGROUND OF THE INVENTION

Field of the Invention

The invention relates to a method for controlling a regenerator for data burst signals in a system having point-to-multipoint connections, in which a central network unit transmits a downstream signal in the downstream direction to a multiplicity of subscriber network units and the subscriber network units transmit data burst signals in the upstream direction to the central network unit and to an appropriate arrangement. The invention also pertains to a transmission system having point-to-multipoint connections, having a central network unit which is connected bidirectionally to a multiplicity of subscriber network units via a splitter, and to a regenerator for data burst signals, which has a reception unit arranged on the input side in the signal direction and a transmission unit arranged on the output side.

In systems having point-to-multipoint connections, the data transmission in one direction can take place in time-division multiplex broadcast mode as a continuous data signal and in the opposite direction in what is known as burst-mode operation as a data burst signal. By way of example, these systems include access networks such as the "passive optical networks", which are called PONs for short.

A PON is characterized by virtue of a central switching and management unit ("optical line termination", OLT for short), subsequently called an optical central network unit, simultaneously transmitting/receiving data to/from a multiplicity of optical subscriber network units ("optical network unit", ONU for short). In this case, the connection is made by means of a passive optical star coupler ("splitter") with the splitting ratio 1:N (N=number of subscribers). The data transmission between the OLT and the subscriber network units ONUi is controlled by transmission protocols. The design of the transmission protocols is stipulated for PONs with a bit rate in the gigabit range, for example in ITU-T standard G.984.3: "Gigabit-capable Passive Optical Networks (G-PON): Transmission convergence layer specification".

FIG. 1 shows the block diagram of a PON as an example. In the example shown, the access area is adjoined by a metro area as a core network. In the metro area, signals are transmitted in wavelength-division multiplex mode, in this case with the wavelengths $\lambda 1$-$\lambda 3$, in order to better utilize the fiber infrastructure. Metro access devices MAP1 to MAP4 are arranged in the interfaces between the metro area, which has a ring configuration, for example, and the access area. These are also called multi-access points, MAPs for short.

The data sent from the optical central network unit OLT to the optical subscriber network units ONUi in the "downstream direction" are selected in line with their wavelength in the multi-access points MAP1 to MAP4 and can also be forwarded without wavelength conversion by an access connection AL and a star coupler KO to the associated subscriber network units ONUi. In addition, a direct connection between the OLT and a further metro access device MAP4 is also shown.

In the "upstream direction", data bursts transmitted by the numerous subscriber network units ONUi via the access connection AL are fed into the metro network via the metro access devices MAP1 to MAP4 and are then transmitted to the OLT. To be able to use a standard transmission wavelength for all ONUs despite WDM in the metro network, and thus to avoid location-dependent ONU variants, wavelength conversion of the upstream signal is frequently required in the MAP. This allows the multiplicity of ONUs in the PON (500-1000 per MAP) to be produced more cheaply, and also allows the installation and spare-parts management to be simplified.

Since the need for ever greater ranges and higher splitting factors for star coupler or couplers, or in other words the number of subscriber network units ONUi per control center OLT, is growing, amplification is required within the optical distribution network. To this end, what are known as 3R regenerators, in which the incoming optical signal is subjected to opto-electrical conversion, amplitude shaping, amplification, clock regeneration and, after electro-optical conversion, further transmission, are used in the path between OLT and ONU, usually in the metro access devices. The use of optical amplifiers in the path between OLT and ONU is also conceivable.

Within the MAPs, the regeneration and wavelength conversion can easily be combined. Since optical methods of wavelength conversion precisely for burst operation upstream are not available in a manner suitable for the field, an O/E/O conversion is required for wavelength conversion. That is to say that a transponder is inserted into the upstream path. This requires a burst mode receiver which can handle a high dynamic range of 17 dB for example, which is the result of different distances ONU—MAP and of the variation in the splitter attenuation and the ONU transmission power.

This means that PONs now also contain burst mode receivers, which need to meet high demands on the dynamic range, outside the OLT within the regenerators. The reception unit of the regenerator therefore sees a signal whose bursts have different levels and which has, between bursts, transmission pauses in which no data are received. The data bursts in the upstream signal have a preamble in their overhead, said preamble being intended to help the receiver to handle the different reception levels from burst to burst and the changing bit phases and to correctly sample the subsequent useful data.

For burst mode receivers in the OLT, the time slots that it allocates to the ONUs and the delay that it prescribes for the upstream frame over the downstream frame (Equalized Round Trip Delay according to 10.4.3/G.984.3) can be taken as a basis for calculating the expected burst start and triggering the decision-maker threshold adjustment accordingly.

A regenerator in the upstream path does not know the burst start in advance. In principle, the decision-maker threshold of the burst mode receiver can be adjusted in the following ways.

In the case of AC-coupled receivers, the coupling time constant determines the length of the maximum transmittable sequence of zeros and ones and the settling/adjustment time for a new ONU level. In this case, the preamble needs to be longer than this adjustment time. The maximum length of a sequence of zeros and ones is reduced by scrambling in the case of GPON. It is not possible to specify an explicit maximum value in this case. G.984 requires 72 successive zeros and ones to be able to be transmitted on the line. However, in the case of AC coupling, the preamble length needs to be a multiple of this length for the required dynamics on the receiver. The necessary extension of the preamble restricts the efficiency of the upstream data transmission in the PON, which means that an AC-coupled receiver is rather disadvantageous in use.

In the case of DC-coupled receivers, it is necessary to redetermine the decision-maker threshold within each preamble. In each burst, a peak-value detector (peak-value rectifier) is used to measure the "0" and "1" levels and to adjust the decision-maker threshold between these values. Control of the "0" and "1" level measurement requires a trigger signal which resets the peak-value rectifier before or at the start of each burst. The trigger signal for redetermining the decision-maker threshold is generated by analyzing the upstream signal. To this end, the gap between the bursts is sought. To recognize the gap, dark-time detection needs to be performed and the switched-off state of the transmission laser of the ONU needs to be explicitly distinguished from zeros within the bursts.

This is simple in the case of 8B/10B-encoded signals, as in the case of EPON (maximum number of zeros/ones on the line limited by the encoding to 5), but difficult in the case of scrambled signals, since—as mentioned above—there is no explicit maximum value for successive zeros. One solution is to increase the size of the gap between the bursts, but this is likewise disadvantageous for the efficiency of the upstream data transmission. A more efficient method for regulating the decision-maker threshold and gain in the regenerator is therefore sought in order to get to grips with the high dynamics.

BRIEF SUMMARY OF THE INVENTION

It is an object of the invention to specify an arrangement for a regenerator arranged between a central network unit and a multiplicity of subscriber network units, which arrangement allows reliable operation of the regenerator for data burst signals. It is also the object of the invention to specify an appropriate method.

The invention achieves these objects by means of a method having the features of patent claim 1 and an arrangement having the features of patent claim 7.

Advantageous developments of the invention are specified in the subclaims.

In line with the invention, in a system having point-to-multipoint connections, a component of the downstream signal is decoupled at a location between the central network unit and the subscriber network units, a header of the downstream signal is read and analyzed, and the header information obtained in this manner is used for controlling a regenerator provided in the upstream path for the data burst signals. This has the advantage that all of the control information in the data burst signals from all ONUs which is contained in the data frame of the downstream signal is now available for controlling the regenerator in the upstream path. This allows a control or trigger signal for the regenerator to be generated reliably. The wide diversity of the information transmitted by the downstream signal affords the opportunity to optimize the burst mode transmission upstream and to reduce transmission errors.

In one variant embodiment of the invention, a control unit provided for the regenerator analyzes the previously read header of the downstream signal in order to ascertain the start and stop times for the data burst signals and matches them to the chronological position of the regenerator between the central network unit and the subscriber network units. The knowledge of the start and end of each burst transmitted by an ONU allows a significant improvement in adjustment of the decision-maker threshold and/or the gain of the burst mode receiver. It is possible to use DC-coupled receivers for the regenerator, since a reliable trigger is available for redetermining the decision-maker threshold. The preamble length can therefore be significantly shortened in comparison with the length required for AC coupling. Since the control signal is independent of reception level and signal quality, the preamble may also be shorter than in the case of a trigger signal obtained directly from the received signal. Shortening the preamble length provides the advantage of greater transmission efficiency.

In one particularly advantageous variant embodiment, in addition to ascertaining the start and end of a data burst, the power level of preceding data burst signals from like ONUs in the upstream path is measured and is stored on the basis of the individual subscriber network units. This not only allows the peak value rectifier to be reset on the burst mode receiver but also advantageously allows the burst mode receiver to be adjusted more accurately to the dynamic range which is to be expected for the next burst. This allows the decision-maker threshold and/or the gain to be regulated.

In a further variant embodiment, the advantages of forward error correction (FEC) are utilized in order to ascertain the control signal. The FEC decoder is used to ascertain the bit errors in the transmitted zeros and ones in the upstream path, and said bit errors are stored on the basis of the individual subscriber network units. The decision-maker threshold or the gain for the bursts from the individual subscriber network units can in this way be adjusted such that the bit error probability on the decoder is minimized. This likewise results in an improvement in the regenerator function and hence in improved data burst transmission.

BRIEF DESCRIPTION OF THE SEVERAL VIEWS OF THE DRAWING

The invention is explained in more detail with reference to exemplary embodiments.

In the drawing.

DESCRIPTION OF THE INVENTION

Figure 1:
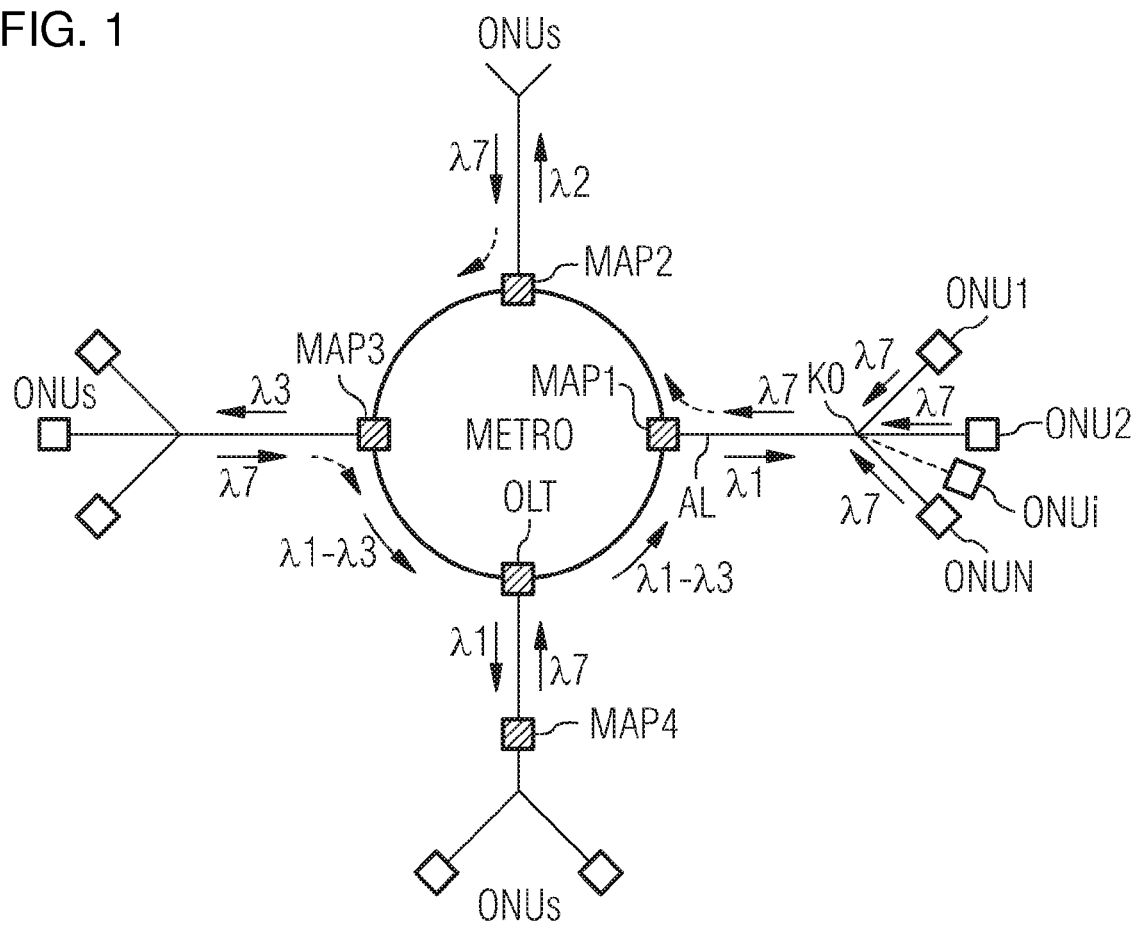
FIG. 1 shows an overview diagram of a passive optical network.
Figure 2:
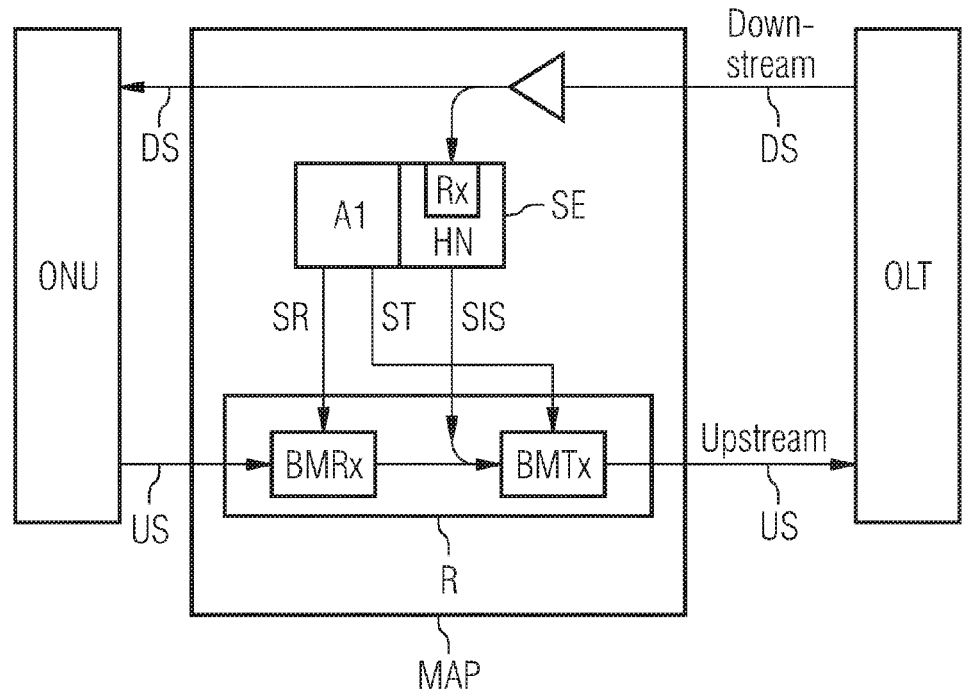
FIG. 2 shows a first block diagram of the arrangement for controlling a regenerator.

FIG. 2 shows a simplified block diagram of a PON system having the inventive arrangement for controlling a regenerator. For the sake of better clarity, only one subscriber network unit ONU is shown, which is connected to the central network unit OLT via a metro access point MAP. In addition, a dedicated transmission fiber is shown both for the downstream signal and for the upstream signal or the data burst signal. This may likewise be the case in the metro area between the OLT and the MAP. In the access area between MAP and the star coupler, the data traffic is usually routed in both directions via just one access fiber.

The regenerator for data burst signals is arranged in the metro access point MAP in the exemplary embodiment shown in the figure. In principle, it is conceivable for the regenerator to be arranged at any desired point in the upstream path of the PON.

In the exemplary embodiment shown in the figure, the invention has provision for a control unit SE to be interposed between the downstream path and the regenerator R arranged in the upstream path. The burst mode regenerator R comprises a burst mode receiver BMRx and a burst mode transmitter BMTx. The burst mode receiver BMRx is usually constructed from an input-side photodiode for o/e conversion, a burst mode amplifier, a decision-maker and a clock and data recovery unit (CDR unit). The burst mode transmitter BMTx usually comprises a laser diode whose output signal is modulated with the burst signal either directly electrically or indirectly using a modulator, as a result of which an e/o conversion takes place. If the laser diode produces an output signal having a different wavelength than the input signal from the photodiode, the wavelength of the upstream signals is converted. If the regenerator R is located in a metro access point MAP, a wavelength converter—not shown in the drawing—may be integrated in the regenerator after the o/e conversion. In this case, the regenerator is also called a transponder.

In the downstream path, a power component of the downstream signal is decoupled and is routed to the receiver Rx of an auxiliary network unit HN. The auxiliary network unit HN is part of the control unit SE according to the invention. The downstream signal is advantageously decoupled downstream of an optical amplifier. The receiver Rx of the auxiliary network unit HN then requires only a negligibly small portion of the downstream power.

The auxiliary network unit HN has the sole task of reading the bandwidth allocation ("bandwidth map") contained in the header of the downstream signal and of participating in the ranging in the manner of a single subscriber network unit ONU.

On the basis of the ITU standard G.984.3 chosen here by way of example, the data transmission between the OLT and the ONUs in a PON is controlled using frame signals in the upstream and downstream directions. The field of the bandwidth map, BW map for short, (cf. chapter 8.1.3.6/G.984.3) is located within the control block PCDd (physical control block downstream) of the downstream frame and contains a data series with bandwidth allocations or transmission time allocations for the individual ONUs. It should be noted that these allocations are based on single "T_CONTs". A T-CONT is a "data container" which is always associated with an ONU. A T-CONT is identified by the field of the Alloc-ID. The pointers to the start and end of a data burst from an ONU are stored in the fields SStart and SStop. The field of the BW map is accordingly used by the OLT to notify every single ONU of the times at which a burst can be sent. The BW map therefore contains the chronological position of the upstream data burst signals from all ONUs relative to the upstream frame.

The ranging (see ITU standard G.984.3, chapter 10.4) is used to stipulate the chronological position of the individual ONUs. Different link delays are leveled by virtue of the OLT allocating an equalization delay to each ONU. The task of the equalization delay is to delay the upstream transmission from each ONU to the OLT, so that collision-free assembly of all ONU bursts to form a joint upstream signal becomes possible in the splitter and the upstream signal arrives at the OLT with the correct phase.

The invention provides for a control or trigger signal SR for redetermining the decision-maker threshold of the regenerator receiver BMRx to be obtained from the times transmitted in the downstream signal for the burst start Tstart and the burst end Tstop. It is therefore no longer necessary to analyze the upstream signal in order to generate a trigger signal. However, for the purpose of calculating the burst start and the burst end, it is also necessary to know, in addition to the BW map, the (chronological) position of the MAP or of the regenerator location between the ONU and the OLT, that is to say the delay between downstream and upstream frames. The burst start is calculated at the location of the regenerator on the basis of the equalization delays which are ascertained during ranging and transmitted to the ONUs.

First of all, the ascertainment of the times for the burst start Tstart and the burst end Tstop from the downstream signal will be discussed in more detail. To read the information contained in the downstream signal, the auxiliary network unit HN synchronizes itself to the downstream frame and extracts the relevant fields of the BW map of the downstream signal. In addition, it processes a restricted set of PLOAM messages. The PLOAM messages are PON management functionalities for the physical layer (cf. G.984.3). This means that the auxiliary network unit reads in PLOAMd messages in the downstream path, and uses them for adjustments and as a trigger for acknowledgements in the form of PLOAMu messages in the upstream frame, which is necessary for the ranging (and the detection of the HN by the OLT), inter alia. In this way, the auxiliary network unit HN performs tasks in the manner of an ONU, with the difference that it does not send and receive any kind of payload. Since the downstream frame contains the bandwidth allocations for all ONUs, the auxiliary network unit HN receives the relevant information regarding the burst start and the burst end from all ONUs. This information can then be used to adjust the regenerator and for communication with the OLT regarding the chronological position of the regenerator. Since it does not send and receive any kind of payload, the implementation complexity is therefore greatly reduced in comparison with a full-value ONU.

For the ranging of the auxiliary network unit HN, an access to the upstream signal is required, since this involves the OLT needing to survey the chronological position of its transmission bursts and its needing to participate in the PLOAM message protocol in order to do so. For this reason, when the downstream frame has been read in the auxiliary network unit, a system information signal SIS (that is to say the PLOAMu messages used as acknowledgement, including the physical layer overhead) is sent to the regenerator. The resulting output signal SIS from the auxiliary network unit HN and the remaining ONU signals from the upstream frame can easily be assembled in the regenerator, since the OLT ensures collision-free classification of the bursts. As the end product of the ranging, the auxiliary network unit HN is allocated an equalization delay, subsequently called EqD(MAP), by the OLT by the downstream signal. The auxiliary network unit HN needs to be ranged before the other ONUs are started up.

The analysis unit A1 which adjoins the auxiliary unit HN is used to evaluate the start and stop times of the individual bursts that are transmitted in the BW map of the downstream frame.

In this case, it should first of all be noted that the start time SStart in the BW map field points to a byte within the upstream frame that is situated outside the preamble at the end of the field PLOu. This means that, for the burst start Tstart, the PLOu time needs to be put in front of the start time Tbwmapstart (see also ITU standard G.984.3, chapter 8.1.3.6.3): The following holds true: Tstart=Tbwmapstart−Tplou Secondly, in addition to the BW map, it is also necessary to take account of the (chronological) position at the location of the regenerator (in this case the metro access point MAP) in order to calculate the burst start and end. The text below uses an example calculation to show how the start time for a burst can be calculated at the location of the regenerator.

To calculate the burst start and end at the location of the regenerator between the ONU and the OLT, it is necessary to take account of the delay between downstream and upstream frames. Each ONU delays its upstream frame in comparison with the downstream frame by the equalization delay $EqD(N)$ allocated by the OLT on an ONU-individual basis.

In this case, the following holds true (the terms correspond to chapter 10.4.2/G.984.3):

$$Rtd = 2*Tpd(N) + Ts + To + Tt + EqD(N)$$

In this equation:

Rtd denotes round trip delay, i.e. the delay between downstream and upstream frames Tpd(N) denotes fiber propagation delay for the ONU N: delay by the optical fiber transmission corresponding to the length thereof between OLT and ONU Ts denotes delay by the signal processing on the ONU To denotes delay by the O/E and E/O conversion of the signal on OLT and ONU. To simplify matters, a standard time for Ts and To is assumed for all ONUs, including the auxiliary network unit HN on the MAP.

Tt denotes delay by the regenerator/transponder

EqD(N) denotes equalization delay for the ONU N.

The round trip delay Rtd (Rtd@OLT) measured on the OLT is prescribed by the OLT. To this end, the equalization delay EqD of each ONU is regulated by the OLT such that the delay Rtd@OLT between downstream and upstream frames on the receiver of the OLT is the same for each ONU.

This regulatory action means that the round trip delay Rtd@MAP between downstream and upstream frames is the same for each ONU at the regenerator input too. The burst start Tstart@MAP relative to the start of the downstream frame in the MAP is given by:

$$Tstart@MAP = Rtd@MAP + Tstart$$

In addition, the following holds true:

$$Rtd@MAP = Rtd@OLT - Tt - 2*Tpd(MAP)$$

(The round trip delay is reduced on the MAP in comparison with that on the OLT by the signal propagation time OLT-MAP in the downstream and upstream directions and by the transponder delay).

In addition, the auxiliary network unit HN on the MAP takes part in the ranging. It is accordingly allocated an equalization delay by the OLT, so that the following holds true:

$$Rtd@OLT = 2*Tpd(MAP) + Ts + To + EqD(MAP)$$

and hence $$Rtd@MAP = 2*Tpd(MAP) + Ts + To + EqD(MAP) - Tt - 2*Tpd(MAP)$$

$$Rtd@MAP = Ts + To + EqD(MAP) - Tt$$

$$Tstart@MAP = Ts + To + EqD(MAP) - Tt + Tstart$$

This shows that the burst start in the MAP Tstart@MAP can easily be calculated from the EqD(MAP) allocated during the ranging and the values from the BW map.

If the start time Tstart@MAP and end time Tend@MAP of the bursts are known at the location of the regenerator (in this case MAP), they can be used to control not only the burst mode receiver but also the burst mode transmitter of the regenerator. To this end, a second control signal ST is transmitted from the auxiliary network unit to the burst mode transmitter BMTx. This control is important for the laser regulation of the burst mode transmitter BMTx, since the burst pauses bring about an inequality between the zeros and ones in the signal which would otherwise result in the laser bias count being misadjusted. As an alternative to transmitter control, it is also possible to insert a filling pattern into the upstream signal in the burst pauses. This insertion is likewise controlled by means of the calculated end and start of the bursts. In this case, it is naturally necessary to maintain a safety interval from the bursts, which prevents any collision between bursts and filling pattern in the event of any tolerances. The control signal ST is also used to insert the acknowledgements PLOAMu from the auxiliary network unit HN to the OLT. The control signal SR triggers burst-specific adjustments and changeover operations for the burst mode receiver BMRx.

In a second variant embodiment, besides the ascertainment of the start time and end time of the bursts at the location of the regenerator (in this case MAP), the levels of the incoming bursts from the individual ONUs are measured on the burst mode receiver and are stored in a table, for example separated on the basis of ONUs or TCONTs.

Figure 3:
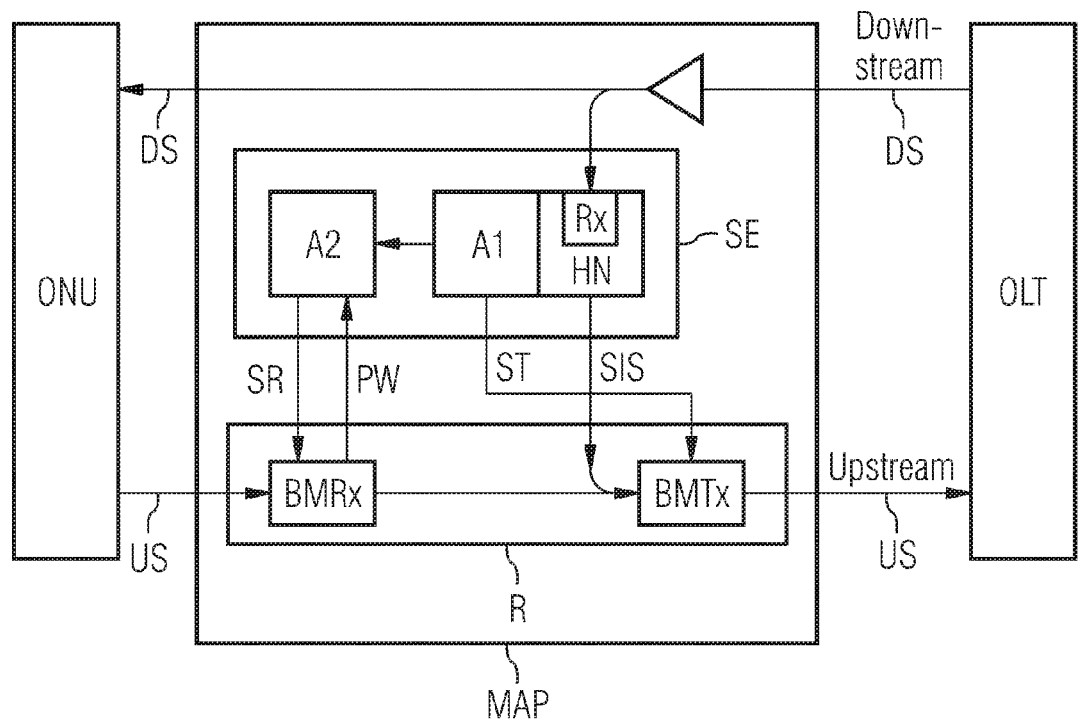
FIG. 3 shows a variant of the arrangement from FIG. 2.

This variant embodiment is shown in FIG. 3. In this case, a further analysis unit A2 besides the analysis unit A1 is contained in the control unit SE. The latter receives not only the input signal from the first analysis unit, which comprises the matched start and stop times and the associated ONU/TCONT descriptors, but also, as a further input signal, the measured level values PW from the burst mode receiver. These level values are used to calculate the required decision-maker threshold and/or gain and to adjust it/them in the burst pause (Gap) on the burst mode amplifier.

In the second analysis unit, by way of example the level values of preceding bursts from the same respective ONUs can be stored, organized on the basis of TCONTs, in a table. A TCONT is always associated with an ONU. Organization on the basis of TCONTs is advantageous over organization on the basis of ONUs, since in this way the auxiliary network unit HN does not need to concurrently track the allocation of the TCONTs to ONUs (PLOAMd message Assign_AllocID) and manage it. Alternatively, it is also possible to store the mean values for the levels averaged over several bursts from an ONU.

The known level values are used to adjust the decision-maker threshold and/or gain on the basis of each ONU. If solely gain regulation takes place, only the "1" level is measured and stored. If, additionally or alternatively, threshold regulation also takes place, the "0" level is also measured and used for ascertaining the optimum threshold for the decision maker. This threshold is then adjusted as well as the gain (or else instead) during the burst pause on the burst mode receiver.

In this variant, first bursts from an ONU are measured and these measured level values are used for adjusting the decision-maker threshold and/or gain for the subsequent bursts. Averaging over several bursts is possible. Since the measured level values always first take effect upon the next burst from the same ONU, the peak value measurement on the burst mode receiver does not need to be performed quickly at the start of the burst, but rather can be performed more slowly. This is advantageous in two ways: the high demands on signal value detection as a result of short bit and preamble lengths are reduced and the preamble does not need to be extended by the measurement time and adjustment time, as would be necessary without buffer storage of the adjustment values beyond a burst. In addition, the duration of the bursts is known and the measurement can be limited to bursts of sufficient length. Overall, the level values can be measured more accurately.

In a third variant embodiment, control of the decision-maker threshold or of the gain when using forward error correction is achieved by virtue of the bit errors being evaluated separately on the basis of zeros and ones. In this case, a surplus of bit errors in transmitted ones in comparison with zeros prompts a lower threshold or a higher gain to be adjusted for an ONU/TCONT, or vice versa if the bit error rate in the transmitted zeros is too high. In the range of very large bit errors in which the FEC is no longer able to provide useful error statistics and the majority of the errors are no longer correctable, it is also possible to use the balance between received zeros and ones for regulatory purposes. This should always be compensated for by scrambling without transmission errors, of course. The regulatory action is performed by compiling error statistics separated on the basis of ONUs or TCONTs, for example. This is done on the FEC decoder, which for reasons of outlay will usually be present on the OLT and not on the MAP. These bit error values or the control information already calculated therefore need to be transmitted from the OLT by means of messages to the auxiliary network unit HN to the MAP, where the transmitted values are taken as a basis for adjusting the decision-maker threshold or gain. Fields such as PLOAMd and OMCI which are defined in the G.984.3 standard, for example, can be used within the downstream frame signal for reporting the bit error values or control information. Alternatively, an FEC decoder could also be arranged on the MAP in addition to the OLT, but this is expensive.

In summary, it should be noted that any combinations of the variant embodiments described are possible.

The trigger signal produced in line with the invention can also be used to improve the properties of a clock and data recovery in the regenerator by virtue of the trigger resetting the phase information stored in the phase evaluation device. This allows the burst mode receiver to adapt more quickly and more precisely to a new phase angle. It becomes possible to extend the integration time of the clock and data recovery beyond the gap length without there being any interaction with the preceding burst. The extension of the integration time results in greater insensitivity to interference. For clock and data recovery using an (analog) PLL, it is also possible to achieve the same advantage by resetting the loop filter.

The auxiliary network unit HN additionally allows the system-internal transmission of error and control information from the regenerator or MAP.

The invention claimed is:

1. A method for controlling a regenerator for data burst signals in a transmission system having point-to-multipoint connections, wherein a central network unit transmits a downstream signal in a downstream direction to a multiplicity of subscriber network units and the subscriber network units transmit data burst signals in an upstream direction in allocated time slots to the central network unit, the method which comprises:
   decoupling a component of the downstream signal at a location between the central network unit and the subscriber network units;
   analyzing a header of the downstream signal to obtain header information;
   reading in the analysing step a burst start and a burst end of the data burst signals from the header of the downstream signal; and
   matching the burst start and the burst end to a position of the regenerator, inserted in an upstream path between the subscriber network units and the central network unit, and using the header information for controlling timing of the regenerator provided for the data burst signals accordingly.

2. The method according to claim 1, which comprises: using matched data of the burst start and the burst end of the data burst signals to adjust a decision-maker threshold and/or gain of the regenerator.

3. The method according to claim 2, which comprises: the step of:
   generating a first control signal for controlling a reception unit of the regenerator and a second control signal for controlling a transmission unit of the regenerator.

4. The method according to claim 3, which comprises: measuring in the upstream path levels of incoming data burst signals from the subscriber network units and storing measured level values, and using for each data burst signal an allocated stored level value for a purpose of individually adjusting a decision-maker threshold and/or a gain of the regenerator.

5. The method according to claim 2, wherein the step of analyzing the header comprises: reading a bandwidth allocation and/or a system information signal in a downstream frame of the downstream signal.

6. The method according to claim 2, which comprises: measuring in the upstream path levels of incoming data burst signals from the subscriber network units and storing measured level values, and using for each data burst signal an allocated stored level value for the purpose of individually adjusting a decision-maker threshold and/or a gain of the regenerator.

7. The method according to claim 2, which comprises: when forward error correction is used, ascertaining bit errors in transmitted zeros and ones in the upstream path and using the bit errors to adjust a decision-maker threshold and/or a gain of the regenerator on the basis of the individual subscriber network units.

8. The method according to claim 1, which comprises the step of:
   generating a first control signal for controlling a reception unit of the regenerator and a second control signal for controlling a transmission unit of the regenerator.

9. The method according to claim 8, which comprises: measuring in the upstream path levels of incoming data burst signals from the subscriber network units and storing measured level values, and using for each data burst signal an allocated stored level value for the purpose of individually adjusting a decision-maker threshold and/or a gain of the regenerator.

10. The method according to claim 1, wherein the step of analyzing the header comprises: reading a bandwidth allocation and/or a system information signal in a downstream frame of the downstream signal.

11. The method according to claim 1, which comprises: measuring in the upstream path levels of incoming data burst signals from the subscriber network units and storing measured level values, and using for each data burst signal an allocated stored level value for the purpose of individually adjusting a decision-maker threshold and/or a gain of the regenerator.

12. The method according to claim 1, which comprises, when forward error correction is used, ascertaining bit errors in transmitted zeros and ones in the upstream path and using the bit errors to adjust a decision-maker threshold and/or a gain of the regenerator on the basis of the individual subscriber network units.

13. A device for controlling a regenerator for data burst signals in a system having point-to-multipoint connections, wherein the regenerator is disposed in an upstream path between a multiplicity of subscriber network units and a central network unit, connected bidirectionally to the sub scriber network units via a downstream path and the upstream path, comprising:
- a control unit connected to the regenerator for controlling the regenerator on the basis of header information of a downstream signal;
- said control unit has an auxiliary network unit and at least one analysis unit connected to the auxiliary network unit,
- said auxiliary network unit is supplied with the component of a downstream signal via a reception unit, and
- said analysis unit is configured to read a burst start and a burst end of the data burst signals from the header of the downstream signal, and wherein the burst start and the burst end are matched to a position of the regenerator between a multiplicity of the subscriber network units and the central network unit, and to output a first control signal to a reception unit and a second control signal to the transmission unit of the regenerator, and these data are used to control the regenerator.

14. The device according to claim 13, wherein said control unit comprises:
- a further analysis unit configured to take level values of the data burst signals, measured on the reception unit of the of the regenerator, and to store the level values for the purpose of individually adjusting a decision-maker threshold and/or gain of the regenerator; and
- to take the header information of the downstream signal as a basis for ascertaining the control signal for a reception unit and to output the control signal to the reception unit controlling a decision-maker threshold and/or gain of the regenerator.

15. The device according to claim 14, wherein said auxiliary network unit is analyzing header information in the downstream signal, which is followed by an output of a system information signal to the regenerator.

16. The device according to claim 15, wherein the device is inserted for regeneration of the upstream burst signals in a passive optical network.

17. The device according to claim 14, wherein said control unit is configured to ascertain the control signal for the reception unit based on bit errors in transmitted zeros and ones in the upstream path.

18. The device according to claim 13, wherein the device is inserted for regeneration of the upstream burst signals in a passive optical network.

19. The device according to claim 13, wherein said auxiliary network unit is analysing header information in the downstream signal, which is followed by an output of a system information signal to the regenerator.

20. The device according to claim 13, wherein said control unit is configured to ascertain the control signal for the reception unit based on bit errors in transmitted zeros and ones in the upstream path.

21. A point-to-multipoint transmission system with a central network unit, connected bidirectionally via a downstream path and an upstream path to a multiplicity of subscriber network units, and a device for controlling a regenerator disposed in the upstream path between the multiplicity of subscriber network units and the central network unit, said device comprising:
- a control unit connected to the regenerator for controlling the regenerator on a basis of header information of a downstream signal transmitted via the downstream path;
- said control unit has an auxiliary network unit and at least one analysis unit connected downstream to the auxiliary network unit;
- said auxiliary network unit is supplied with the component of a downstream signal via a reception unit, and wherein analysing the header information of the downstream signal is followed by an output of a system information signal to the regenerator;
- said analysis unit is configured to read a burst start and a burst end of the data burst signals from the header of the downstream signal;
- wherein the burst start and the burst end are matched to a position of the regenerator between a multiplicity of the subscriber network units and the central network unit, and to output a first control signal to a reception unit and a second control signal to a transmission unit of the regenerator, and these control signals are used to control the regenerator.

22. The point-to-multipoint transmission system according to claim 21, wherein said auxiliary network unit is analysing the header information in the downstream signal, which is followed by an output of a system information signal to the regenerator.

* * * * *